(12) United States Patent
Harutyunyan

(10) Patent No.: US 7,931,884 B2
(45) Date of Patent: *Apr. 26, 2011

(54) WELDING OF CARBON SINGLE-WALLED NANOTUBES BY MICROWAVE TREATMENT

(75) Inventor: Avetik Harutyunyan, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/609,917

(22) Filed: Oct. 30, 2009

(65) Prior Publication Data

US 2010/0175985 A1    Jul. 15, 2010

Related U.S. Application Data

(63) Continuation of application No. 10/991,824, filed on Nov. 17, 2004, now Pat. No. 7,611,687.

(51) Int. Cl.
| | |
|---|---|
| *B01J 19/08* | (2006.01) |
| *B01J 35/00* | (2006.01) |
| *C09C 1/56* | (2006.01) |
| *C01B 31/02* | (2006.01) |
| *C07C 1/00* | (2006.01) |
| *C07C 6/00* | (2006.01) |
| *A62D 3/00* | (2007.01) |
| *D01F 9/12* | (2006.01) |
| *D01C 5/00* | (2006.01) |

(52) U.S. Cl. .............. 423/445 B; 423/460; 423/461; 423/447.1; 423/447.2; 423/447.3; 204/157.15; 204/157.43; 204/158.2; 977/742; 977/751

(58) Field of Classification Search ............. None
See application file for complete search history.

(56) References Cited

U.S. PATENT DOCUMENTS

| | | | |
|---|---|---|---|
| 6,325,909 B1* | 12/2001 | Li et al. | 205/106 |
| 6,871,528 B2* | 3/2005 | Schlaf et al. | 73/105 |
| 6,974,492 B2 | 12/2005 | Harutyunyan et al. | |
| 2003/0042128 A1* | 3/2003 | Harutyunyan et al. | 204/158.2 |
| 2004/0222081 A1* | 11/2004 | Tour et al. | 204/157.15 |
| 2005/0272856 A1* | 12/2005 | Cooper et al. | 524/496 |

OTHER PUBLICATIONS

Ponomareva; Formation Pathways for Single-Wall Carbon nanotube Multiterminal Junctions, New Journal of Physics, 5; Sep. 30, 2003.*

* cited by examiner

*Primary Examiner* — Melvin C Mayes
*Assistant Examiner* — Guinever S Gregorio
(74) *Attorney, Agent, or Firm* — Fenwick & West LLP; Mark E. Duell

(57) ABSTRACT

Methods and processes for preparing interconnected carbon single-walled nanotubes (SWNTs) are disclosed. The SWNTs soot, synthesized by any one of the art methods, is heated to less than about 1250° C. in flowing dry air using the electrical field (E) component of microwave energy. The tubes of the SWNTs thus treated become welded and interconnected.

11 Claims, 3 Drawing Sheets

WELDING OF CARBON SINGLE-WALLED NANOTUBES BY MICROWAVE TREATMENT

CROSS-REFERENCE TO RELATED APPLICATIONS

This application is a continuation of and claims priority from U.S. patent application Ser. No. 10/991,824, filed Nov. 17, 2004, now U.S. Pat. No. 7,611,687, and which application is incorporated herein by reference in its entirety.

FIELD OF INVENTION

The present invention relates to methods for the preparation of carbon single-walled nanotubes, in particular, the synthesis of interconnected nanotubes.

BACKGROUND

Carbon nanotubes are hexagonal networks of carbon atoms forming seamless tubes with each end capped with half of a fullerene molecule. They were first reported in 1991 by Sumio Iijima who produced multi-layer concentric tubes or multi-walled carbon nanotubes by evaporating carbon in an arc discharge. In 1993, Iijima's group and an IBM team headed by Donald Bethune independently discovered that a single-wall nanotube could be made by vaporizing carbon together with a transition metal such as iron or cobalt in an arc generator (see Iijima et al. Nature 363:603 (1993); Bethune et al., Nature 363: 605 (1993) and U.S. Pat. No. 5,424,054). The original syntheses produced low yields of non-uniform nanotubes mixed with large amounts of soot and metal particles.

Presently, there are three main approaches for the synthesis of single- and multi-walled carbon nanotubes. These include the electric arc discharge of graphite rod (Journet et al. Nature 388: 756 (1997)), the laser ablation of carbon (Thess et al. Science 273: 483 (1996)), and the chemical vapor deposition of hydrocarbons (Ivanov et al. Chem. Phys. Lett 223: 329 (1994); Li et al. Science 274: 1701 (1996)). Multi-walled carbon nanotubes can be produced on a commercial scale by catalytic hydrocarbon cracking while single-walled carbon nanotubes are still produced on a gram scale.

Generally, single-walled carbon nanotubes are preferred over multi-walled carbon nanotubes because they have unique mechanical and electronic properties. Defects are less likely to occur in single-walled carbon nanotubes because multi-walled carbon nanotubes can survive occasional defects by forming bridges between unsaturated carbon valances, while single-walled carbon nanotubes have no neighboring walls to compensate for defects. Defect-free single-walled nanotubes are expected to have remarkable mechanical, electronic and magnetic properties that could be tunable by varying the diameter, number of concentric shells, and chirality of the tube.

The synthesis of SWNTs by any of the methods described above produces individual tubular structures where the carbon atoms comprising the hexagonal rings are $sp^3$ hybridized. For some applications, such as electrical applications, electrochemical applications, and for applications requiring mechanical strength, interconnected SWNTs may be preferred. The interconnected SWNTs have large surface area which is advantages for applications, such as for super-capacitors, high energy density batteries, high density catalyst support applications, and the like.

The tubular SWNTs can be joined with "X," "Y," and/or "T" type molecular junctions that require the carbon atoms at the junction be $sp^2$ hybridized. U.S. Pat. No. 6,495,258 to Chen et al. describes a method of creating a three-dimensional density distribution of carbon nanotubes, where a substrate having a network of randomly oriented fibers is created, and carbon nanotubes are dispersed in the network. The fibers are nickel fibers sintered together at their crossing points. Thus, in the method of Chen, the carbon nanotubes are not directly connected with each other; instead, the substrate is used to provide the 3-dimensional distribution of nanotubes. In another method described by Imholt et al. (2003) Chem. Mater. 15: 3969-3970, nanotubes are heated to a temperature of at least 1500° C. using a microwave field that fuses the nanotubes together. A method described by Terrones et al. (2002) Phys. Rev. Lett. 89: 75505-1 dissolves SWNTs in ethanol which are then subjected to electron irradiation at high temperatures in a transmission electron microscope that resulting in cross-linking between the tubes. The methods of Imholt et al. and Terrones et al. use high temperature to link carbon nanotubes.

These methods either do not directly connect the nanotubes or employ harsh conditions and are expensive for application to large scale synthesis of interconnected SWNTs. Thus, there is a need for simple and reliable methods for producing interconnected SWNTs. Accordingly, the present invention provides methods and processes for joining carbon nanotubes.

SUMMARY

The present invention provides methods and processes for welding single-walled carbon nanotubes (SWNTs). SWNTs can be synthesized by any one of the art methods, and can be fibers, bundles, or soot. The SWNTs are exposed to the electrical field (E) component of microwave energy which heats the SWNTs to about 1200° C., thereby welding together the SWNTs.

In one aspect, the present invention provides methods for producing interconnected single-walled carbon nanotubes (SWNTs) wherein a sample of SWNTs is placed in a microwave cavity wherein the electric field is near maximum; and the sample is then exposed to microwave field at a temperature less than about 1400° C. The microwave field has a frequency between 1 GHz and about 5 GHz, preferably a frequency between about 2 GHz and about 3 GHz, and power between about 100 watts and about 450 watts. The sample can be heated to a temperature between about 1000° C. and about 1400° C., preferably between about 1000° C. and about 1200° C.

In another aspect, the methods for producing interconnected single-walled carbon nanotubes (SWNTs) involve placing a sample of SWNTs in a microwave cavity wherein the electric field is near maximum; and exposing the sample to microwave field at a temperature less than about 1400° C., wherein the microwave field has a frequency between 1 GHz and about 3 GHz, and power between about 150 watts and about 400 watts. The SWNTs are interconnected by a "X," "Y," or "T" type junction.

These and other aspects of the present invention will become evident upon reference to the following detailed description. In addition, various references are set forth herein which describe in more detail certain procedures or compositions, and are therefore incorporated by reference in their entirety.

DETAILED DESCRIPTION

I. Definitions

Figure 1:
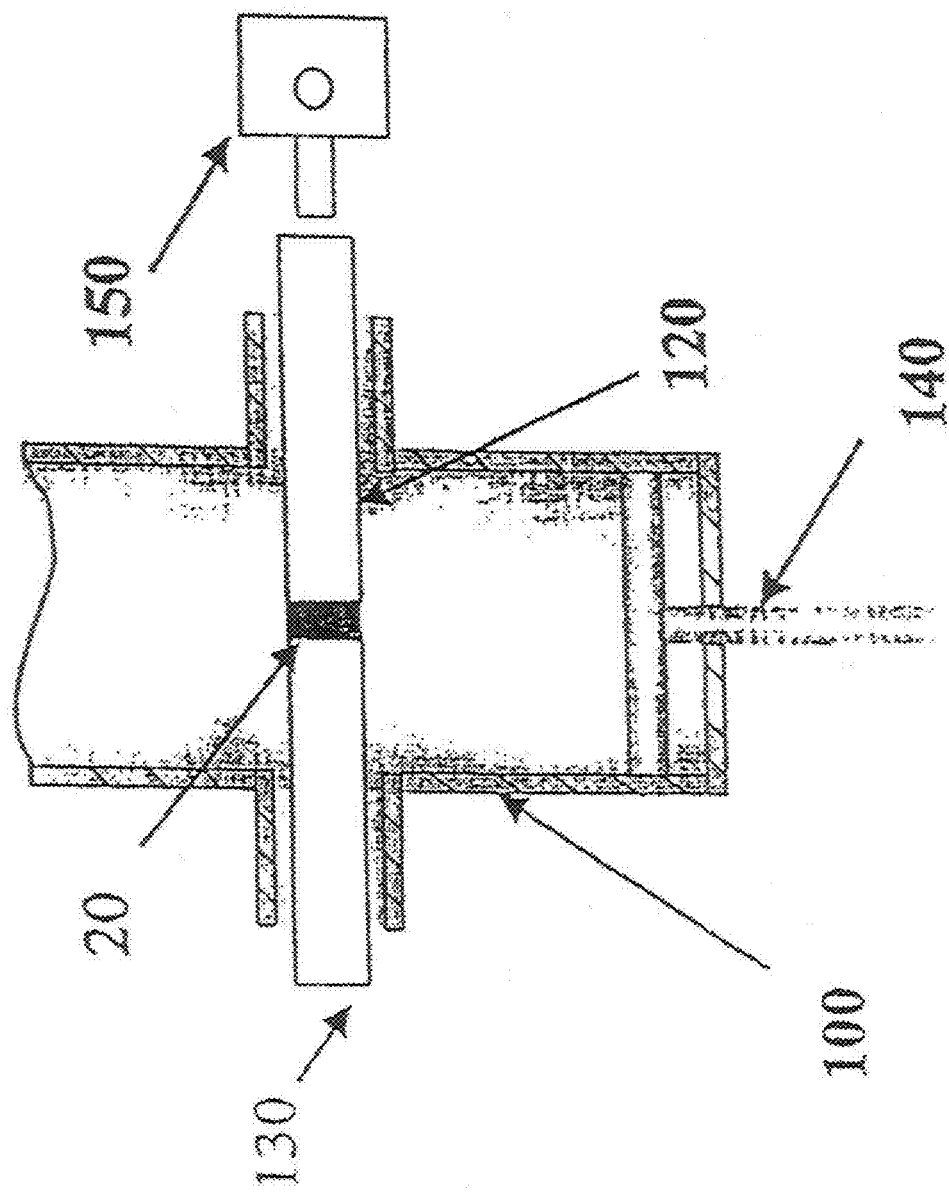
FIG. 1 illustrates an apparatus for carrying out the present invention.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, New York.

The terms "single-walled carbon nanotube" or "one-dimensional carbon nanotube" are used interchangeable and refer to cylindrically shaped thin sheet of carbon atoms having a wall consisting essentially of a single layer of carbon atoms, and arranged in an hexagonal crystalline structure with a graphitic type of bonding.

The term "multi-walled carbon nanotube" as used herein refers to a nanotube composed of more than one concentric tubes.

The terms "metalorganic" or "organometallic" are used interchangeably and refer to co-ordination compounds of organic compounds and a metal, a transition metal or metal halide.

II. Overview

The present invention discloses methods and processes for producing interconnected single-walled carbon nanotubes (SWNTs). The SWNTs can be produced by any of the known methods, and then subjected to microwave heating at about 1200° C. The microwave can be any commercially available model, such as 1.5 kW operating at 2.45 GHz, where the power output can be varied from about 150 W to about 400 W. The SWNTs are placed in a microwave cavity where the electrical field (E) component of the microwave is near the maximum. The methods produce SWNTs that become welded by forming "X," "Y," or "T" type junctions between adjacent tubes.

III. Synthesis of Carbon Nanotubes

The SWNTs can be fabricated according to a number of different techniques familiar to those in the art. For example, the SWNTs can be fabricated by the laser ablation method of U.S. Pat. No. 6,280,697, the arc discharge method of Journet et al. Nature 388: 756 (1997), the chemical vapor deposition method where supported metal nanoparticles can be contacted with the carbon source at the reaction temperatures according to the literature methods described in Harutyunyan et al., NanoLetters 2, 525 (2002), and the like. Preferably, the SWNTs are produced by the chemical vapor deposition method.

The chemical vapor deposition (CVD) method for the synthesis of carbon nanotubes uses carbon precursors, such as carbon containing gases. In general, any carbon containing gas that does not pyrolize at temperatures up to 800° C. to 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof.

The catalyst composition for use in CVD can be any catalyst composition known to those of skill in the art. Conveniently, the particles will be of a magnetic metal or alloy, such as, for example, iron, iron oxide, or a ferrite such as cobalt, nickel, chromium, yttrium, hafnium or manganese. The particles useful according to the invention will preferably have an average overall particle size of up to 50 nm to about 1 μm, although, in general, the particle sizes for individual particles can be from about 400 nm to about 1 μm.

The function of the catalyst when used in the carbon nanotube growth process is to decompose the carbon precursors and aid the deposition of ordered carbon. The methods and processes of the present invention preferably use metal nanoparticles as the metallic catalyst. The metal or combination of metals selected as the catalyst can be processed to obtain the desired particle size and diameter distribution, and can be separated by being supported on a material suitable for use as a support during synthesis of carbon nanotubes. As known in the art, the support can be used to separate the catalyst particles from each other thereby providing the catalyst materials with greater surface area in the catalyst composition. Such support materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. Silica, alumina and other materials known in the art may be used as support, preferably alumina is used as the support.

The metal catalyst can be selected from a Group V metal, such as V or Nb, and mixtures thereof, a Group VI metal including Cr, W, or Mo, and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Pt—Cr, Pt—W, and Pt—Mo. Preferably, the metal catalyst is iron, cobalt, nickel, molybdenum, or a mixture thereof, such as Fe—Mo, Co—Mo and Ni—Fe—Mo.

The metal, bimetal, or combination of metals are used to prepare metal nanoparticles having defined particle size and diameter distribution. The catalyst nanoparticles can be prepared by thermal decomposition of the corresponding metal salt added to a passivating solvent, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. The metal salt can be any salt of the metal, and can be selected such that the salt is soluble in the solvent and/or the melting point of the metal salt is lower than the boiling point of the passivating solvent. Thus, the metal salt contains the metal ion and a counter ion, where the counter ion can be nitrate, nitrite, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent. The solvent can be an ether, such as a glycol ether, 2-(2-butoxyethoxy)ethanol, $H(OCH_2CH_2)_2O(CH_2)_3CH_3$, which will be referred to below using the common name diethylene glycol mono-n-butyl ether, and the like.

Preferably, the support material is added to the reaction mixture containing the metal salt. The support material can be added as a solid, or it can be first dissolved in the passivating solvent and then added to the solution containing the metal salt. The solid support can be silica, alumina, MCM-41, MgO, $ZrO_2$, aluminum-stabilized magnesium oxide, zeolites, or other supports known in the art, and combinations thereof. For example, $Al_2O_3$—$SiO_2$ hybrid support could be used. Preferably, the support material is soluble in the passivating solvent. In one aspect, the counterion of the metal salt and the support material is the same, thus, for example, nitrites can be the counterion in the metal salt and in the support material. Thus, the support material contains the element of the support material and a counter ion, where the counter ion can be nitrate, nitrite, nitride, perchlorate, sulfate, sulfide, acetate, halide, oxide, such as methoxide or ethoxide, acetylacetonate, and the like. Thus, for example, nitrites can be the counterion in metal ions (ferrous nitrite) and in the support material (aluminum nitrite), or the support can be aluminum oxide ($Al_2O_3$) or silica ($SiO_2$). The support material can be powdered thereby providing small particle sizes and large surface areas. The powdered support material can preferably have a particle size between about 0.01 μm to about 100 μm, more preferably about 0.1 μm to about 10 μm, even more preferably about 0.5 μm to about 5 μm, and most preferably about 1 μm to about 2 μm. The powdered support material can have a surface area of about 50 to about 1000 $m^2/g$, more preferably a surface area of about 200 to about 800 $m^2/g$. The powdered oxide can be freshly prepared or commercially available. For example, a suitable $Al_2O_3$ powder with 1-2 μm particle size and having a surface area of 300-500 $m^2/g$ is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution. The weight ratio of metal nanoparticles to powdered oxide can be between about 1:1 and 1:10, such as, for example, 1:1, 2:3, 1:4, 3:4, 1:5, and the like.

After forming a homogenous mixture, metal nanoparticles are formed during the thermal decomposition. The thermal decomposition reaction is started by heating the contents of the reaction vessel to a temperature above the melting point of at least one metal salt in the reaction vessel. The average particle size of the metal nanoparticles can be controlled by adjusting the length of the thermal decomposition. Typical reaction times range from about 20 minutes to about 2400 minutes, depending on the desired nanoparticle size. Metal nanoparticles having an average particle size of about 0.01 nm to about 20 nm, more preferably about 0.1 nm to about 3 nm and most preferably about 0.3 nm to 2 nm can be prepared. The metal nanoparticles can thus have a particle size of 0.1, 1, 2, 3, 4, 5, 6, 7, 8, 9, or 10 nm, and up to about 20 nm. In another aspect, the metal nanoparticles can have a range of particle size, or diameter distribution. For example, the metal nanoparticles can have particle sizes in the range of about 0.1 nm and about 5 nm in size, about 3 nm and about 7 nm in size, or about 5 nm and about 11 nm in size.

The supported metal nanoparticles can be aerosolized by any of the art known methods. In one method, the supported metal nanoparticles are aerosolized using an inert gas, such as helium, neon, argon, krypton, xenon, or radon. Preferably argon is used. Typically, argon, or any other gas, is forced through a particle injector, and into the reactor. The particle injector can be any vessel that is capable of containing the supported metal nanoparticles and that has a means of agitating the supported metal nanoparticles. Thus, the catalyst deposited on a powdered porous oxide substrate can be placed in a beaker that has a mechanical stirrer attached to it. The supported metal nanoparticles can be stirred or mixed in order to assist the entrainment of the catalyst in the transporter gas, such as argon.

Thus, the nanotube synthesis generally occurs as described in the co-pending and coowned application U.S. Ser. No. 10/727,707, filed on Dec. 3, 2003. An inert transporter gas, preferably argon gas, is generally passed through a particle injector. The particle injector can be a beaker or other vessel containing the growth catalyst supported on a powdered porous oxide substrate. The powdered porous oxide substrate in the particle injector can be stirred or mixed in order to assist the entrainment of the powdered porous oxide substrate in the argon gas flow. Optionally, the inert gas can be passed through a drying system to dry the gas. The argon gas, with the entrained powdered porous oxide, can then be passed through a pre-heater to raise the temperature of this gas flow to about 400° C. to about 500° C. The entrained powdered porous oxide is then delivered to the reaction chamber. A flow of methane or another carbon source gas and hydrogen is also delivered to the reaction chamber. The typical flow rates can be 500 sccm for argon, 400 sccm for methane, and 100 sccm for He. Additionally, 500 sccm of argon can be directed into the helical flow inlets to reduce deposition of carbon products on the wall of the reaction chamber. The reaction chamber can be heated to between about 300° C. and 900° C. during reaction using heaters. The temperature is preferably kept below the decomposition temperature of the carbon precursor gas. For example, at temperatures above 1000° C., methane is known to break down directly into soot rather than forming carbon nanostructures with the metal growth catalyst. Carbon nanotubes and other carbon nanostructures synthesized in reaction chamber can then be collected and characterized.

In one aspect of the invention, the diameter distribution of the synthesized SWNTs is substantially uniform. Thus, about 90% of the SWNTs have a diameter within about 25% of the mean diameter, more preferably, within about 20% of the mean diameter, and even more preferably, within about 15% of the mean diameter. Thus, the diameter distribution of the synthesized SWNTs can be about 10% to about 25% within the mean diameter, more preferably about 10% to about 20% of the mean diameter, and even more preferably about 10% to about 15% of the mean diameter.

In one aspect, the prepared nanotube sample can be composed of a mixture of metallic-type carbon SWNTs and semiconducting-type carbon SWNTs. The nanotube sample may be of any size that is convenient for processing within the microwave cavity. In an embodiment, the prepared nanotube sample weighs approximately 100 mg. In another embodiment, the prepared nanotube sample weighs between about 10 milligrams and 10 grams.

In another aspect, the prepared carbon nanotube sample can contain additional materials formed during synthesis of the carbon nanotubes, such as amorphous carbon created as a reaction byproduct during synthesis of carbon nanotubes by CVD or laser vaporization. Further, the SWNTs can contain materials added to facilitate carbon nanotube synthesis, such as metal nanoparticles used as a growth catalyst. In still another embodiment, the prepared carbon nanotube sample may contain low levels of additional materials, such as trace levels of metals or other impurities.

In another aspect, the SWNTs can be optionally further treated to remove additional conductive or ferromagnetic materials. For example, SWNTs synthesized by CVD growth on a growth catalyst composed of metal nanoparticles can optionally be treated with an acid to remove the metal nanoparticles. The treatment removes the conductive or ferromagnetic materials that are present in sufficient amount to interact with microwave energy and produce significant heating.

IV. Welding of Carbon Nanotubes

The SWNTs synthesized above can be connected with "X," "Y," and/or "T" type molecular junctions by exposing the SWNTs to microwave radiation. FIG. 1 depicts an apparatus suitable for exposing a carbon nanotube sample to microwave energy. A SWNT sample 20 is placed inside microwave cavity 100. Any conventional microwave cavity capable of supporting a standing wave can be used, such as a tunable $TE_{103}$ single mode cavity. Microwave cavity 100 includes a microwave source (not shown) for generating microwave energy of a desired frequency. Suitable microwave sources are available from Toshiba Corp. of Tokyo, Japan, such the 2.45 GHz microwave source capable of a maximum power of 1.2 kilowatts.

In an embodiment, a sample of SWNTs 20 is placed in a quartz boat (not shown) or other treatment vessel that can be inserted into quartz tube, and then is inserted into microwave cavity 100. In an embodiment, the position of nanotube sample 20 can be adjusted by changing the location of the treatment vessel. In another embodiment, the sample position may be changed by adjusting the position of quartz tube 120. Dry air and argon are introduced into microwave cavity 100 and quartz tube 120 via inlet 130. The temperature of a carbon sample 20 may be measured using an infrared optical pyrometer 150, such as the Mikron M90BT available from Mikron, Inc. of Oakland, N.J.

In one aspect, microwave cavity 100 includes cavity tuning wall 140 for adjusting the resonance properties of the cavity. The position of cavity tuning wall 140 determines what frequencies can produce a stationary wave (or standing wave) within the microwave cavity 100 as well as the locations of maxima and minima of the electric and magnetic field components of the stationary wave.

The SWNT sample is positioned within the microwave cavity at a location corresponding to a maximum in the electric field for a stationary wave of a desired frequency. In a microwave cavity or other type of resonance chamber, the chamber may be tuned to produce a stationary wave at a particular frequency. Once a stationary wave is established, the amplitudes of the electric and magnetic fields will not vary as a function of location. Thus, any maxima and minima in the electric and magnetic fields will occur at fixed locations within the chamber.

Figure 2:
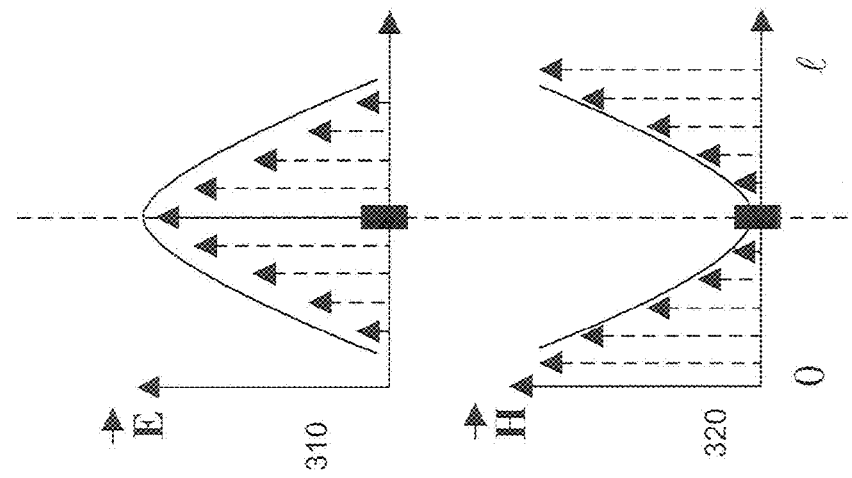
FIG. 2 illustrates the variation of the electric and magnetic fields within a microwave chamber.
Figure 2:
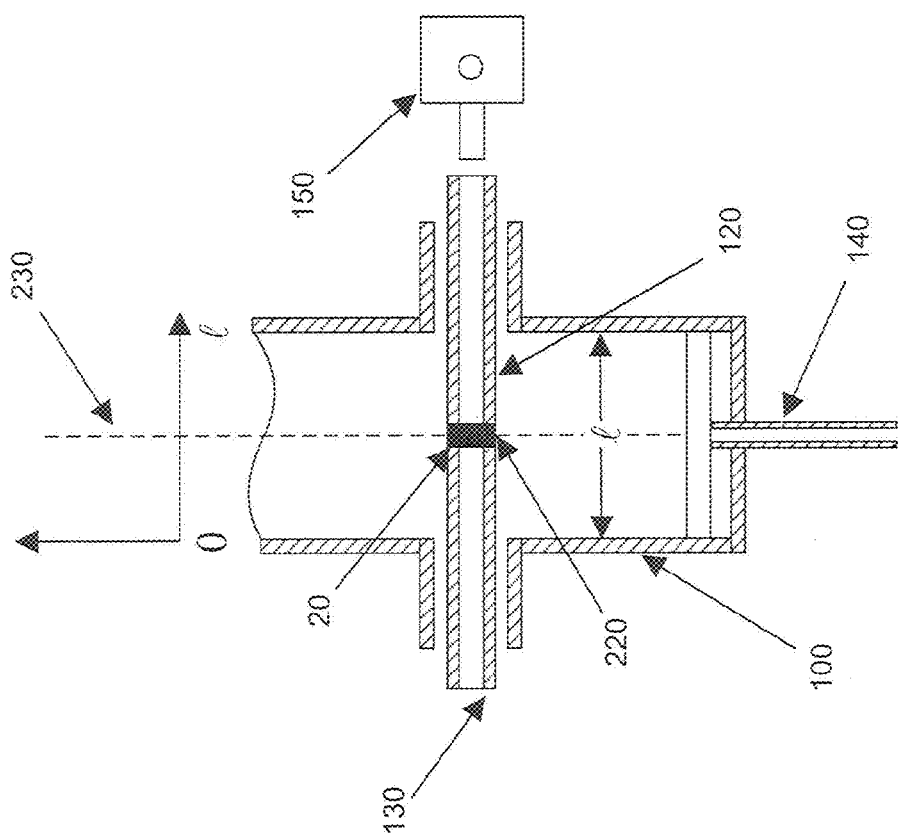

FIG. 2 depicts an example of the electric and magnetic field amplitudes for a stationary wave in a microwave cavity 100 according to an aspect of the invention. Microwave cavity has a length 'L' along the propagation axis of the stationary wave. Plots 310 and 320 show the variation in the electric and magnetic fields for the stationary wave as a function of distance along the propagation axis. Plot 310 shows that the electric field is at a maximum in the center of the chamber while plot 320 shows a corresponding minimum for the magnetic field vector. Those skilled in the art will recognize that stationary waves with other patterns of maxima and minima may be constructed by varying such factors as the frequency of the electromagnetic wave or the size and shape of the chamber. These variations can be used to create stationary waves of a desired microwave frequency that have maxima in the electric field amplitude in one or more convenient locations within a microwave cavity.

The sample of SWNTs can be placed in a location corresponding to a maximum in the electric field amplitude for a stationary wave of a desired frequency. In an embodiment, positioning 220 comprises placing a prepared nanotube sample at a maximum in the electric field amplitude that occurs in the center of a microwave cavity. In another embodiment, positioning 220 comprises placing a plurality of prepared nanotube samples at positions within a microwave cavity corresponding to a series of maxima in the electric field amplitude of a stationary wave. Other embodiments will be apparent to those of skill in the art.

After positioning 220 the nanotube sample, the nanotube sample is exposed to microwave energy 230 at a selected frequency. The microwave frequency can be any frequency, such as from 1 GHz to 300 GHz, preferably from 1 GGHz to about 10 GHz, more preferably from 1 GHz to about 4 GHz, such as 2 GHz, 2.3 GHz, 2.4 GHz, 2.45 GHz, 2.5 GHz, 2.55 GHz, 2.6 GHz, and the like. For example, a 100 g nanotube sample can be exposed to a 2.45 GHz stationary wave with a power of 150 watts while flowing dry air through the microwave cavity at 100 standard cubic centimeters (sccm). The SWNTs can be exposed to microwaves for about 1 min. to about 1000 min., preferably from about 5 min. to about 60 min.

The amount of power used during exposure of a nanotube sample to microwave energy depends on the size of the nanotube sample. In one aspect of the invention, the nanotube sample can be heated to a temperature less than about 1450° C., as measured by a pyrometer. Thus, the SWNT sample can be heated to a temperature between about 450° C. and about 1400° C., preferably about 1000° C. and about 1300° C., such as equal to or less than about 1200° C. Those skilled in the art will recognize that the amount of power required to achieve a temperature will depend on the mass of the nanotube sample. Thus, the power supply can be a variable power supply allowing for selection of a power between about 50 watts and about 2 kilowatts, preferably between about 100 watts and about 300 watts. It is generally preferred to maintain the temperature of the nanotube sample below about 1400° C. to prevent excessive damage to the semiconducting-type nanotubes. The methods and processes described above are advantages in that large amounts of SWNTs can be processed, and less microwave power can be used since the nanotubes are heated using only the E-component of the microwave.

The carbon nanotubes and nanostructures produced by the methods and processes described above can be used in applications that include Field Emission Devices, Memory devices (high-density memory arrays, memory logic switching arrays), Nano-MEMs, AFM9 imaging probes, distributed diagnostics sensors, and strain sensors. Other key applications include: thermal control materials, super strength and light weight reinforcement and nanocomposites, EMI shielding materials, catalytic support, gas storage materials, high surface area electrodes, and light weight conductor cable and wires, and the like.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. In a typical procedure, $Fe(NO_2)_2$ was used at a molar ratio of Fe:Al of 1:2. Under a nitrogen atmosphere, $Fe(NO_2)_2$ was added to water in the molar ratio of 1 mM:20 mM. Then aluminum nitrite was added to the metal salt containing aqueous solution. The reaction mixture was mixed using a mechanical stirrer under the nitrogen atmosphere, and heated under reflux for 90 minutes. The reaction was cooled to about 60° C. while flowing a stream of $N_2$ over the mixture to remove the solvent. A black film formed on the walls of the reaction flask. The black film was collected and ground with an agate mortar to obtain a fine black powder.

Example 2

Synthesis of Carbon Nanotubes

Carbon nanotubes were synthesized by using the experimental setup described in Harutyunyan et al., NanoLetters 2, 525 (2002). CVD growth of bulk SWNTs used the catalysts prepared in Example 1 and methane as a carbon source (T=800° C., methane gas flow rate 60 sccm). The carbon SWNTs were successfully synthesized with a yield of about 40 wt % (wt % carbon relative to the iron/alumina catalyst). Analysis of transmission electron microscopy (TEM) images of SWNTs produced showed bundles were produced. Raman spectra of carbon SWNTs produced using produced by the method above were obtained using $\lambda=532$ nm and $\lambda=785$ nm laser excitation.

Example 3

Weldings of Carbon Nanotubes

Figure 3:
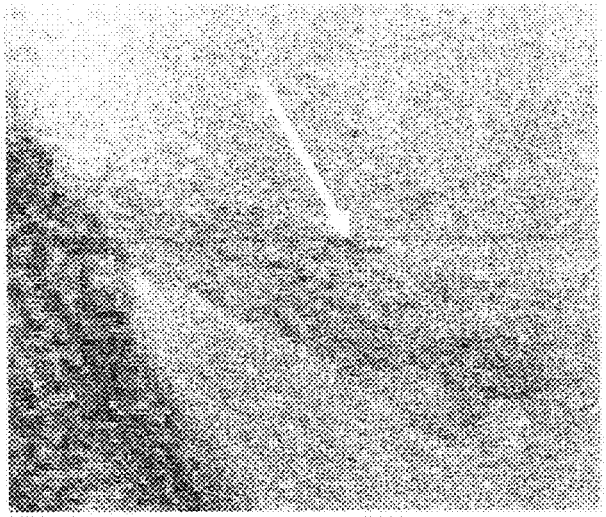
FIG. 3 depicts TEM images of welded SWNTs after microwave treatment.
Figure 3:
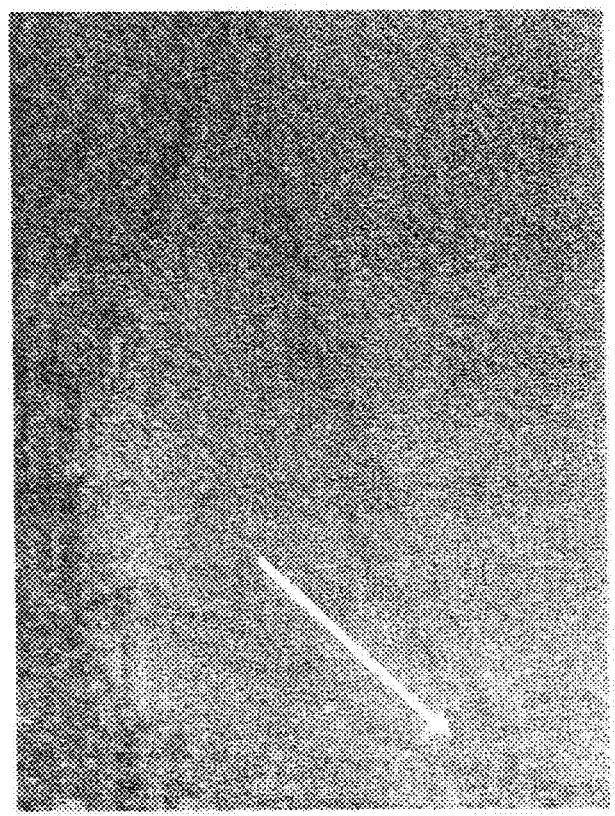

Carbon nanotubes synthesized in Example 2 (50 g), was placed in a quartz tube, and the quartz tube was placed in the cavity where the component of the electric field was the maximum. The microwave welding of the SWNT soot was conducted at about 1200° C. in dry air flowing at 100 sccm using tuned $TE_{103}$ single mode cavity driven by a 1.5 kW and 2.45 GHz power supply. The power was varied from about 150 W to about 400 W, and the induced effective temperature in the sample was measured by an infrared optical pyrometer with an accuracy off ±5° C. The SWNTs thus treated were analyzed by TEM, and the TEM image in FIG. 3 shows the formation of junctions between single-walled carbon nanotubes.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

I claim:

1. A method for producing interconnected single-walled carbon nanotubes (SWNTs), the method comprising:
   providing a stationary electromagnetic wave in a microwave cavity, wherein the stationary electromagnetic wave has an electric field component;
   positioning a sample of SWNTs in the microwave cavity at a maximum in the electric field and a minimum in a magnetic field; and
   exposing the sample to a microwave field at a temperature less than 1400° C. to produce the interconnected single-walled carbon nanotubes.

2. The method of claim 1, wherein the microwave field has a frequency between 1 GHz and 5 GHz.

3. The method of claim 2, wherein the microwave field has a frequency between 1 GHz and 3 GHz.

4. The method of claim 3, wherein the microwave field has a frequency between 2 GHz and 3 GHz.

5. The method of claim 1, wherein the microwave field has a power between 100 watts and 450 watts.

6. The method of claim 1, wherein the temperature is between 1000° C. and 1400° C.

7. The method of claim 6, wherein the temperature is between 1000° C. and 1200° C.

8. A method for producing interconnected single-walled carbon nanotubes (SWNTs), the method comprising:
   providing a stationary electromagnetic wave in a microwave cavity, wherein the stationary electromagnetic wave has an electric field component;
   positioning a sample of SWNTs in the microwave cavity at a maximum in the electric field and a minimum in a magnetic field; and
   exposing the sample to a microwave field at a temperature less than 1400° C., wherein the microwave field has a frequency between 1 GHz and about 3 GHz, and power between 150 watts and 400 watts to produce the interconnected single-walled carbon nanotubes.

9. The method of claim 8, wherein the temperature is between 1000° C. and 1400° C.

10. The method of claim 9, wherein the temperature is between 1000° C. and 1200° C.

11. The method of claim 8, wherein the SWNTs are interconnected by an "X," "Y," or "T" type junction.

* * * * *

UNITED STATES PATENT AND TRADEMARK OFFICE
CERTIFICATE OF CORRECTION

| | |
|---|---|
| PATENT NO. | : 7,931,884 B2 |
| APPLICATION NO. | : 12/609917 |
| DATED | : April 26, 2011 |
| INVENTOR(S) | : Avetik R. Harutyunyan |

Page 1 of 1

It is certified that error appears in the above-identified patent and that said Letters Patent is hereby corrected as shown below:

Column 10, line 52, after "and," delete "about".

Signed and Sealed this
Ninth Day of August, 2011

David J. Kappos
*Director of the United States Patent and Trademark Office*